Nov. 25, 1969    A. S. RICCA    3,479,675
SELF-LOCKING SCREW-THREADED ELEMENT AND METHOD OF MAKING IT
Filed May 31, 1967
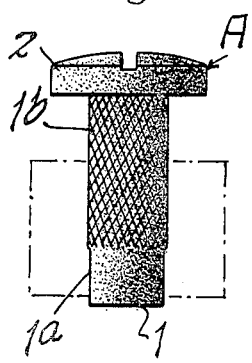
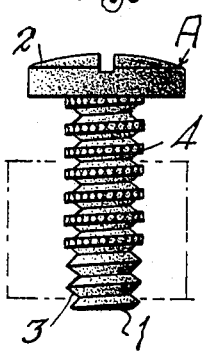
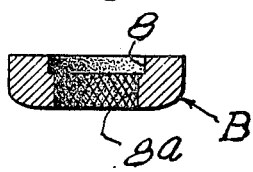
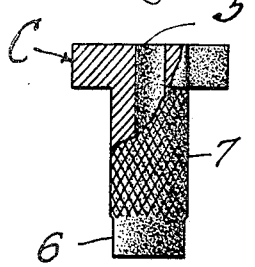
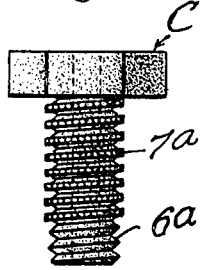
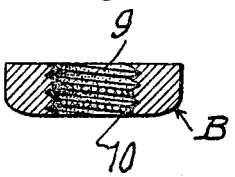
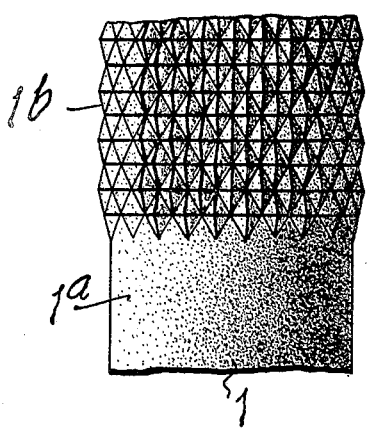
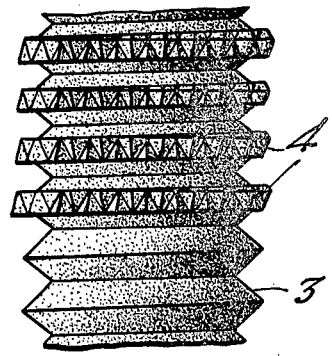
INVENTOR.
Anthony S. Ricca
BY
ATTORNEY

United States Patent Office

3,479,675
Patented Nov. 25, 1969

3,479,675
SELF-LOCKING SCREW-THREADED ELEMENT AND METHOD OF MAKING IT
Anthony S. Ricca, 49 Berkeley Ave.,
Belleville, N.J. 07109
Filed May 31, 1967, Ser. No. 642,482
Int. Cl. B23g 9/00
U.S. Cl. 10—10                                                     2 Claims

ABSTRACT OF THE DISCLOSURE

The smooth portion of an element such as a bolt or nut before the screw thread is formed, has a portion thereof knurled so that the surface is both roughened and increased in diameter, after which the screw thread is formed, for example on an automatic screw machine so that the crest of the thread in the knurled portion is rough and of slightly larger diameter than the normal portion of the thread so as to jam in a normally threaded mated element to relatively lock the threads of said elements.

Background of the invention

Self-locking screw-threaded elements are well known, and Patents Nos. 2,135,637 and 3,233,258 show screw-threaded elements in which a normally formed thread is knurled throughout a portion of its length after the normal thread has been formed. Such self-locking elements leave much to be desired in that the knurling of the thread after it has been cut has a tendency to reduce the diameter of the thread and the element cannot be produced on an automatic machine.

Furthermore the knurling after the formation of the thread exerts a pressure on the exterior surface of the element so that, for example, a small electronic screw that has a longitudinal bore might be crushed or deformed by the pressure incident to knurling.

Summary

It is an object of the invention to provide a self-locking screw-threaded element and a method of making it which shall overcome the objections to and difficulty in manufacture of the known screw-threaded elements and methods of making them.

Particularly the invention contemplates a screw-threaded element and a method of making it which shall be simple and relatively inexpensive; and to provide a method that can be performed on an automatic machine whereby production of the elements is rapid and economical.

Brief description of the drawings

FIG. 1 is a side elevation of an element after completion of the knurling operation in accordance with the invention;

FIG. 2 is a similar view after completion of the threading operation;

FIG. 3 is an enlarged side elevation, similar to FIG. 1 of a hollow or tubular electronic screw;

FIG. 4 is a view similar to FIG. 2 showing the electronic screw completed;

FIG. 5 is a transverse vertical sectional view of an element to be internally threaded to produce a nut in accordance with the invention and showing the completion of the knurling operation;

FIG. 6 is a similar view showing the completed element;

FIG. 7 is a greatly enlarged fragmentary and somewhat exaggerated side elevation of the portion of the element of FIG. 1 enclosed within the broken line; and FIG. 8 is a similar view of the portion of the element of FIG. 2 enclosed within the broken line.

Description of the preferred embodiments

Specifically describing the invention and with particular reference to FIGS. 1 and 2, the element A is in the form of a screw or bolt having a shank 1 which is initially cylindrical and smooth and of the desired diameter for the normal thread as indicated at 1a and has a head 2 at one end thereof.

The portion of the shank that it is desired to interlock with a mating element such as a nut or a screw-threaded socket in a plate or the like, is roughened as by knurling as indicated at 1b so that the diameter of the knurled portion is slightly greater than the normal smooth diameter indicated at 1a. A preferred form of roughening is the known diamond knurling that is produced in a known manner by the usual knurling tool.

Then a screw thread is formed in the shank and extends into the knurled portion 1b, the thread 3 in the unknurled or initially smooth portion 1a being a normal thread and the crest of the thread 4 in the knurled portion being rough and of generally larger diameter than the crest of the normal portion 3.

In the element as shown, the normal portion extends inwardly of the shank from the end opposite the head, and the normal threaded portion 3 may be screwed into a mating element such as a nut or a screw-threaded socket until the roughened portion 4 of the thread starts to enter the thread of the mating element, whereupon the portion 4 becomes jammed in the normal thread on the mating element so as to relatively lock said threads. Thus the portion 4 of the screw serves to lock the mating element such as a nut against accidental unscrewing, or where the screw is threaded into a socket, the portion 4 of the thread prevents unscrewing of the screw out of the socket. It has been found that the self-locking element may be repeatedly used with a normally threaded mating element without substantial impairment of the effectiveness of the knurled portion 4.

The invention is especially desirable in the production of small electronic screws like those designated C which are tubular or have a bore 5 therethrough so that the walls of the bore are relatively thin. In producing such elements, the element is formed initially with a smooth cylindrical shank of the desired diameter for the normal thread as indicated at 6, then the element is knurled as indicated at 7; and then the element is drilled to produce the bore 5. This method eliminates the possibility of the walls of the bore being crushed by the knurling operation. The element is completed by forming the thread as hereinbefore described to produce a normal threaded portion 6a and another portion 7a having the knurled or roughened crest.

FIGS. 5 and 6 illustrate the production of a self-locking nut for use with a normal screw-threaded screw or bolt. The element B is first bored to produce a smooth portion 8 of the desired diameter for the finished thread. A part of the wall of this opening is then knurled as indicated at 8a so that the diameter is also slightly reduced. The thread is then formed to produce the normal portion 9 and the locking portion 10 wherein the crest of the thread is rough and of slightly less diameter than the portion 9. When the nut is mated with a normally threaded element such as a screw or bolt, the thread of the portion 9 permits the nut to be screwed onto the screw or bolt the desired distance and then the knurled threaded portion 10 will jam on the thread of the mating element so as to lock the two elements together.

One important advantage of the invention is that the elements can be formed on automatic machines, for example screw cutting machines. The important feature is that the locking portion of the thread is roughened or knurled prior to the formation of the thread. It will be understood by those skilled in the art that the location of the locking portions will vary depending upon the intended use of the elements. It will be observed that the roughening as the result of the knurling occurs on the crest and both sides of the thread but extends only for a small part of the depth of the thread.

The invention can be used to make self-locking screw-threaded elements of all sizes even extremely small ones- one sixty-fourth of an inch in diameter.

I claim:

1. The method of making a self-locking screw-threaded element comprising the first step of producing an element having a smooth surface to be screw-threaded, the second step of roughening a portion of said surface and thereby increasing the diameter thereof and leaving another portion smooth, and the third step of forming a continuous screw thread in both of said portions.

2. The method as defined in claim 1 wherein said second step consists in knurling and said third step consists in machine cutting the thread.

References Cited

UNITED STATES PATENTS

| | | | |
|---|---|---|---|
| 510,035 | 12/1893 | Lipe | 10—10 |
| 2,135,637 | 11/1938 | Gade | 151—22 |
| 3,159,842 | 12/1964 | Neuschotz | 10—10 |
| 3,163,872 | 1/1965 | Rosan et al. | 10—86 |
| 3,233,258 | 2/1966 | Neuschotz | 10—86 |

FOREIGN PATENTS 840,759    7/1960   Great Britain.

CHARLES W. LANHAM, Primary Examiner

E. M. COMBS, Assistant Examiner

U.S. Cl. X.R.

10—27, 86